(12) United States Patent
DiTullio et al.

(10) Patent No.: US 12,088,885 B2
(45) Date of Patent: Sep. 10, 2024

(54) QR SCAN FOR BACKGROUND STREAMING

(71) Applicant: Atmosphere.tv, Austin, TX (US)

(72) Inventors: Jeff DiTullio, Austin, TX (US); Alen Durbuzovic, Austin, TX (US); Brent Alan Hays, Austin, TX (US); Zach Hobbs, Austin, TX (US)

(73) Assignee: Atmosphere.tv, Austin, TX (US)

( * ) Notice: Subject to any disclaimer, the term of this patent is extended or adjusted under 35 U.S.C. 154(b) by 0 days.

(21) Appl. No.: 17/941,771

(22) Filed: Sep. 9, 2022

(65) Prior Publication Data

US 2024/0089546 A1    Mar. 14, 2024

(51) Int. Cl.
*H04N 21/4725* (2011.01)
*G06K 7/14* (2006.01)
*H04N 21/258* (2011.01)

(52) U.S. Cl.
CPC ....... *H04N 21/4725* (2013.01); *G06K 7/1417* (2013.01); *H04N 21/25816* (2013.01)

(58) Field of Classification Search
CPC ......... H04N 21/4725; H04N 21/25816; G06K 7/1417
See application file for complete search history.

(56) References Cited

U.S. PATENT DOCUMENTS

| | | | |
|---|---|---|---|
| 2012/0023516 A1* | 1/2012 | Wolinsky | H04N 21/44222 725/12 |
| 2014/0129861 A1* | 5/2014 | Capuozzo | H04L 65/612 713/323 |
| 2014/0195316 A1* | 7/2014 | Vorotyntsev | H04L 47/522 705/14.66 |

FOREIGN PATENT DOCUMENTS

CN    202210981401.4    * 4/2023    ........... H04N 21/858

* cited by examiner

*Primary Examiner* — Sumaiya A Chowdhury (57) ABSTRACT

Systems and methods are disclosed for employing QR code scanning to identify instances of background streaming. In certain embodiments, a method may comprise verifying a content stream is being viewed, including generating a scannable indicator including metadata related to a content stream, displaying the scannable indicator during the content stream, receiving a message indicating that the scannable indicator has been scanned, and continuing to display the content stream based on the message.

20 Claims, 4 Drawing Sheets

QR SCAN FOR BACKGROUND STREAMING

SUMMARY

In certain embodiments, a method may comprise verifying a content stream is being viewed, including generating a scannable indicator including metadata related to a content stream, displaying the scannable indicator during the content stream, receiving a message indicating that the scannable indicator has been scanned, and continuing to display the content stream based on the message.

In certain embodiments, a system may comprise a content streaming system configured to verify a content stream is being viewed, including: generate a scannable indicator including metadata related to a content stream, display the scannable indicator during the content stream, receive a message indicating that the scannable indicator has been scanned, and continue to display the content stream based on the message.

In certain embodiments, a memory device may store instructions that, when executed, cause a processor to perform a method comprising: verifying a content stream is being viewed, including generating a scannable indicator including metadata related to a content stream, displaying the scannable indicator during the content stream, receiving a message indicating that the scannable indicator has been scanned, and continuing to display the content stream based on the message.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
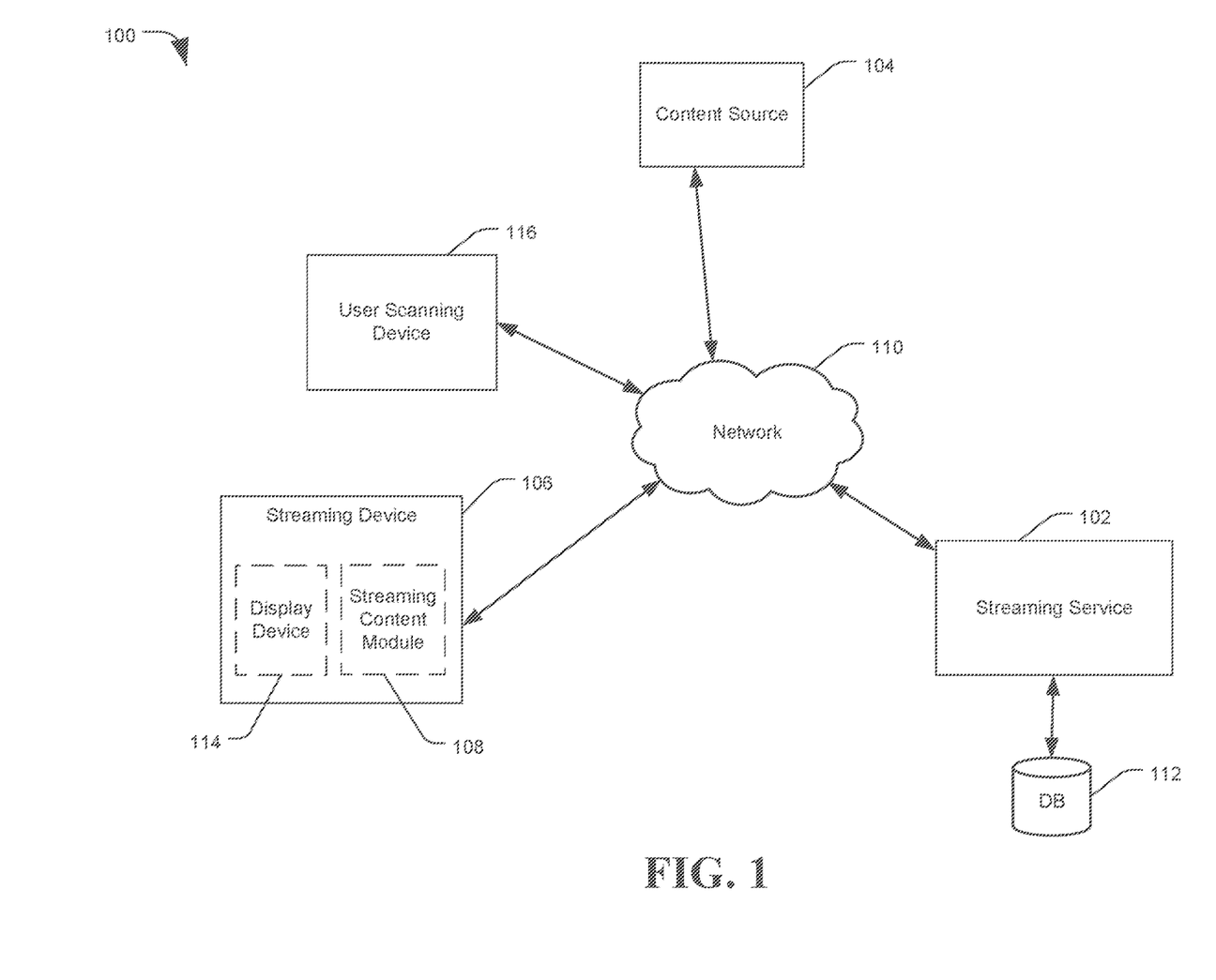
FIG. 1 is a diagram of a system configured to implement a QR scan for background streaming, in accordance with certain embodiments of the present disclosure.

FIG. 1 depicts a diagram of a system 100 configured to implement a quick response (QR) scan for background streaming, in accordance with certain embodiments of the present disclosure. The system 100 may include a streaming service 102, a content source 104, a streaming device 106, a user scanning device 116, and a network 110 over which the components of system 100 may communicate and exchange data. Each or any of streaming service 102, content source 104, streaming device 106, user scanning device 116, and network 110 may be implemented via computers, servers, hardware and software modules, or other system components. Further, streaming service 102 may include or have access to a database (DB) or storage system 112. DB 112 may include one or more data storage devices, data storage mediums, data storage servers, and related data structures, and may store information about streaming device 106 or associated client systems, streaming content data, or other information.

Streaming service 102 may generate, publish, or broadcast streaming content to streaming device 106. Some or all of the content, such as video segments or advertisements, may be obtained or transmitted from content source 104. In some embodiments, the streaming service 102 may acquire (e.g., download) content from content source 104 and generate streaming content to send to streaming device 106 over network 110. In some other embodiments, the streaming service 102 may provide content source 104 with a list or sequence of content elements to include in a content feed, and the streaming content can be provided from content source 104 to streaming device 106 via network 110.

Streaming device 106, such as computers, smartphones, set-top boxes, or televisions, may receive streaming content such as video feeds. Streaming device 106 may include a streaming content module 108 and display device 114. Streaming content module 108 may receive streamed content, such as from streaming service 102 or content source 104 via network 110, and perform any data conversion necessary to display the streaming content on display device 114. In some examples, streaming content module 108 may also generate or load content to display with a stream, such as advertisements or scannable indicators, such as QR codes. Display device 114 may be a computer, smartphone, or similar device, or simply a display element such as a monitor or television. In some examples, a business may stream content to a television or video display device 114 at the business location for the entertainment of customers. Streaming content may include both video segments and advertisements, as well as supplemental overlay data, such as news tickers, sports scores, stock market updates, a listing of current or upcoming video segments, or other data.

There may be costs associated with providing streaming content, such as network bandwidth costs, power requirements to keep computing components operating, and costs having to do with display agreements for content or advertisements. Accordingly, it may be advantageous to pause or turn off streaming content if the content is not being viewed. For example, streaming content module 108 may be receiving and playing streaming content, but the display device 114 may be turned off, set to a different input, or the stream is otherwise unviewable. "Background streaming" may refer to when a streaming content module 108 is playing or displaying a content stream, but the stream is not being viewed or is unviewable. There may be no reliable process to accurately determine if a streaming device 106 is currently background streaming, which can result in incurring unnecessary streaming costs.

Accordingly, the system 100 may be configured to implement a QR scan to identify instances of background streaming. A component of system 100, such as streaming service 102 or streaming device 106, may dynamically generate a QR code to display at streaming device 106 along with or as part of the streaming content. The QR code may be presented along with an invitation to a viewer of the stream to scan the QR code. The invitation may include a straightforward query such as "are you still watching?", or may include other engagement methods, such as an invitation to take a survey, enter a content, or submit a vote or quiz answer.

If a viewer scans the QR code with a user scanning device 116, the QR code may connect the user scanning device 116 with an application program interface (API) for the streaming service 102 or streaming device 106 via the network 110, e.g., by displaying a web link or directly initiating a network connection. The API may obtain information from the user scanning device 116, such as metadata that was included in the dynamic QR code. For example, the QR code may include a device identifier that uniquely identifies the streaming device 106, which can notify the API that the stream playing at the streaming device 106 is viewable and not background streaming. In another example, the QR code may include a verification identifier associated with the invitation displayed with the QR code. The verification identifier may enable the API to redirect the user scanning device 116 to a website or application (e.g., at content source 104, or through streaming service 102) at which the user may participate in a survey, enter a content, submit a vote or quiz answer, depending on what the invitation displayed with the QR code was.

Based on the user scanning device 116 contacting the API based on the QR code, the API can determine that the scanned stream is active and viewable. The API can send an indicator or other message to streaming service 102, streaming device 106, or another component confirming that the stream in question is not a background stream, and should continue playing. If no user scans a QR code for a selected number of times, the streaming service 102 or streaming device 106 may determine that the stream is a background stream, and may pause or stop the stream. Optionally, a QR code may be generated and displayed at streaming device 106 that invites a user to scan the code to resume the stream, which may follow a similar process of accessing an API to indicate that the stream is now viewable.

The QR code may be generated and displayed at set intervals, or may instead be displayed when there is an indication that the streaming device 106 may be background streaming. For example, streaming device 106 or streaming service 102 (e.g., in DB 112) may store information identifying active business hours for a business in which the streaming device 106 is located, or common viewing hours for a household. If the stream is playing outside of the identified hours, it may indicate that there is background streaming. In another example, if no user inputs are received at streaming device 106 for a selected amount of time (e.g., from a remote control or other UI interface), QR codes may then be generated periodically. The QR code may be displayed as part of or in-between streaming video segments (e.g., in a primary video area of display device 114), or may be incorporated into overlay data, such as a sidebar displayed next to the primary video area.

By generating a dynamic QR code to display with streaming content, instances of background streaming may be identified without interrupting the current viewing experience. Scanning the QR code by any viewer with a scanning device 116 can notify the streaming service API that the stream is active, without requiring input from a device owner or someone with physical access to the streaming device 106 or a remote control. Further, active stream status can be confirmed while increasing viewer engagement, through invitations to participate in surveys, polls, or contests. An example implementation of system 100 is discussed in more detail in regard to FIG. 2.

Figure 2:
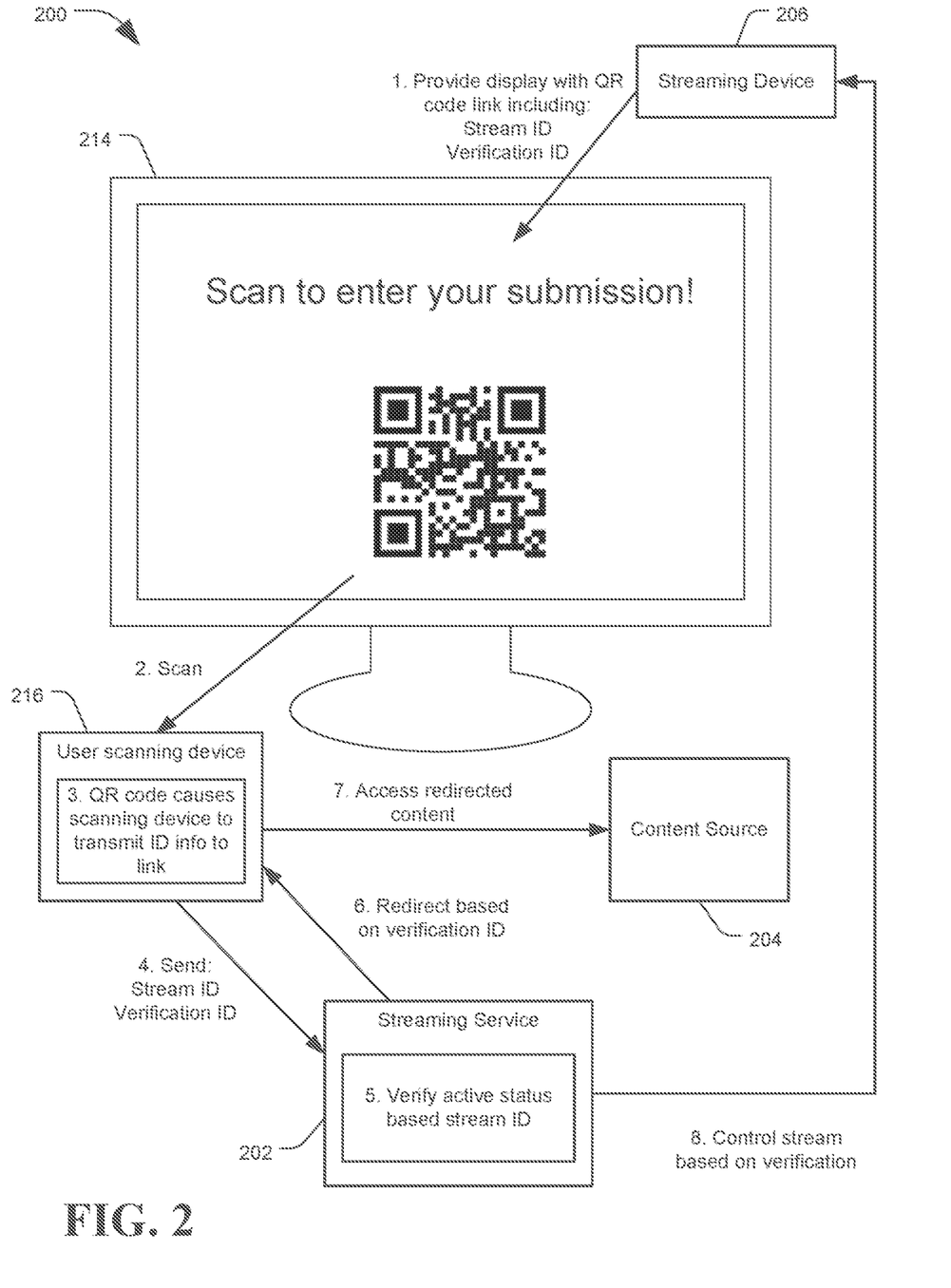
FIG. 2 is a diagram of a system configured to implement a QR scan for background streaming, in accordance with certain embodiments of the present disclosure.

FIG. 2 depicts a diagram of a system 200 configured to implement a QR scan for background streaming, in accordance with certain embodiments of the present disclosure. In particular, FIG. 2 presents an example embodiment of a streaming service system configured to generate QR codes and present them with a streaming content feed to identify unviewable "background" streams. System 200 may include a streaming service 202, a streaming device 206, a display device 214, a user scanning device 216, and a content source 204. In some embodiments, the system 200 of FIG. 2 may correspond to the system 100 of FIG. 1.

Streaming device 206 may be a computing device configured to receive streaming content over a network, and display the stream on a display device 214. The streaming device may include a set-top box or streaming stick, a smartphone, a gaming console, a smart TV, or any other device capable of the described operations. The streaming content may be received from a remote source, such as streaming service 202 or content source 204.

In order to identify background streams, a dynamic QR code may be generated and displayed along with the streaming content, at step 1. The QR code may be generated in response to one or more indicators that background streaming may be occurring, or the QR code may be generated periodically regardless of background streaming indicators. The QR code may be generated by streaming device 206, streaming service 202, or content source 204. The QR code may be inserted into the content stream by displaying it during an ad break between video segments, generated as overlay data, or displayed temporarily over or alongside the video stream. The QR code may be dynamically generated to include metadata such as a device identifier for streaming device 206, and a network link that can direct a scanning device 216 to access an API for the streaming service. In some embodiments, a promotion or other invitation may be generated or loaded and displayed along with the QR code. The invitation may invite a user to scan the QR code to participate in a survey, vote in a poll or contest, or submit quiz answers. Different invitations may have different associated verification or promotion identifiers, which may also be included in the QR code.

At step 2, a viewer may use a scanning device 216, such as a smartphone or tablet, to scan the QR code. The scanning device 216 may interpret the QR code to extract the included metadata, such as the network link, device ID, and verification ID, at step 3. The scanning device 216 may automatically follow the included network link by, e.g., opening a web browser and navigating to the link, or the device 216 may generate a clickable link that the user can interact with to follow the link.

The network link may direct the scanning device 216 to an API hosted by or associated with streaming service 202. Once the scanning device 216 has following the network link, at step 4, it may provide the metadata extracted from the QR code to the API, such as an identifier for the stream or streaming device 206, and a verification ID for any invitation displayed with the QR code.

The API may verify that the stream at streaming device 206 is active and not background streaming based on the stream ID, at step 5. Further, the API may redirect the scanning device 216 to a confirmation page or user input form, such as based on the verification ID, at step 6. The API may automatically redirect the user scanning device 216 automatically (e.g., server-side), or provide a new link for the scanning device 216 to follow, at step 7. The confirmation page or user input form may be hosted at a different service or system from streaming service 202, such as at content source 204.

Based on verifying the active status of the stream, the API may generate an indicator or message to notify the streaming system, at step 8. For example, the API may notify the streaming service 202 itself, which may cause the streaming service to continue providing streaming content to the streaming device 206 uninterrupted. Similarly, the streaming service 202 may provide an indicator that the stream is still active to the streaming device 206, and the streaming device 206 controls whether the stream continues playing or is paused. An example method for implementing a QR scan for background streaming is discussed in regard to FIG. 3.

Figure 3:
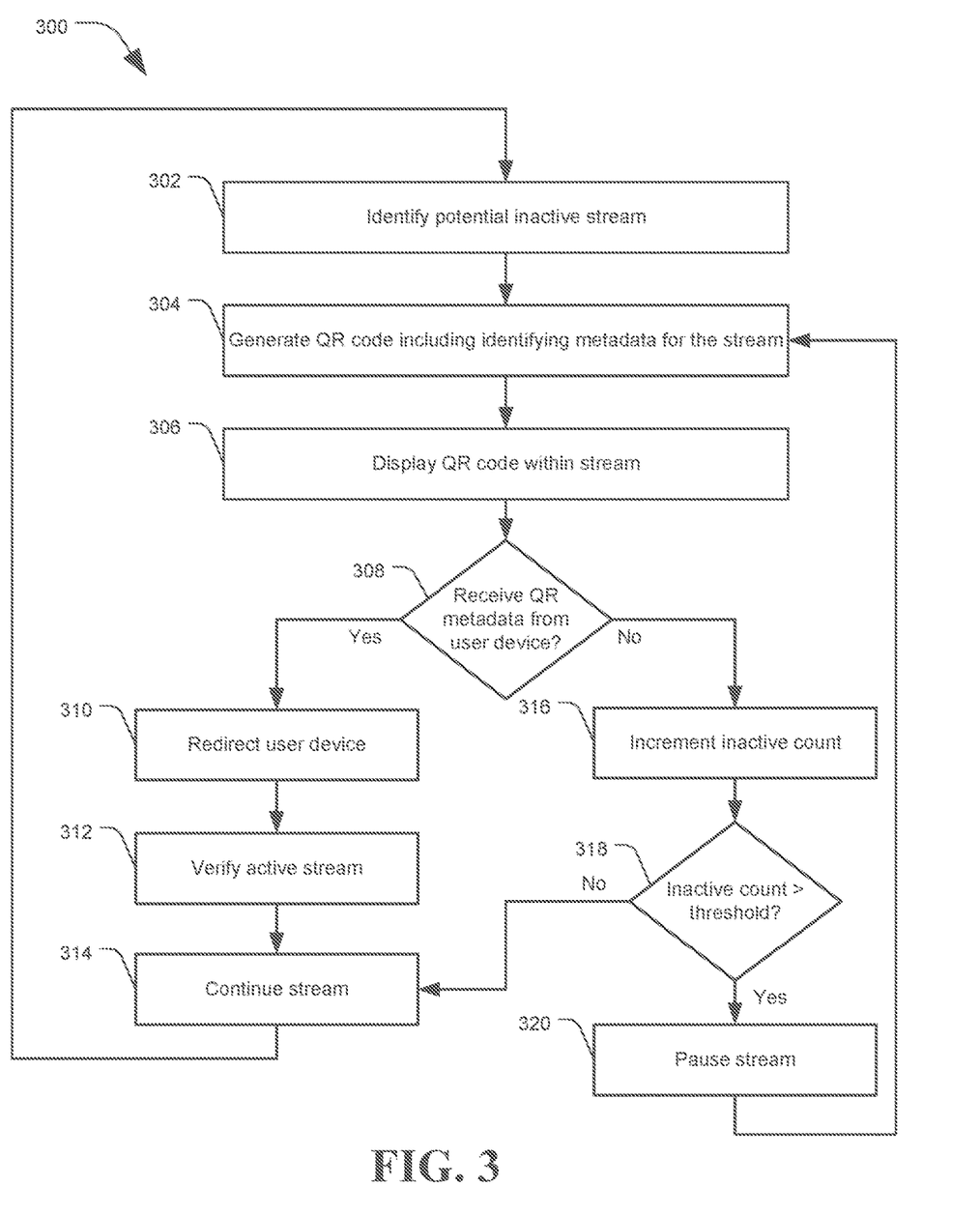
FIG. 3 depicts a flowchart of an example method for implementing a QR scan for background streaming, in accordance with certain embodiments of the present disclosure.

FIG. 3 depicts a flowchart 300 of an example method for implementing a QR scan for background streaming, in accordance with certain embodiments of the present disclosure. In particular, the method of FIG. 3 may be a process for displaying a QR code during a content stream, and determining whether to continue presenting the content stream based on whether the QR code was scanned. The method of FIG. 3 may be implemented by systems shown in FIG. 1, such as streaming service 102, content source 104, streaming device 106 and streaming content module 108, or some combination thereof, generally collectively referred to as the streaming service 102.

The method may include identifying a potentially inactive or "background" stream that is unviewable or not being viewed, at 302. A potential background stream may be identified based on a stream being played outside specified or observed viewing hours, based on a length of time since a last user input to change a stream channel, adjust volume, or other inputs, an amount of time since a previous QR code was scanned, any other method, or a combination thereof.

At 304, the method may include generating a QR code to include identifying metadata for the stream. The identifying metadata may include a device ID for a streaming device, a stream ID uniquely identifying the stream being broadcast at a particular location of a display device, an invitation or verification ID that uniquely identifies a promotion or invitation to scan the QR code that may be presented along with the QR code, or other identifying information. The QR code may also be generated to include one or more web or network links, such as a network address for an API associated with the streaming service. The method may include displaying the QR code within the stream, such as by inserting the QR code and any associated invitation within designated slots of the stream (e.g., advertisement slots or between video segments), into overlay displays such as sidebar or L-bars presented on the display device with the main stream content, or otherwise inserted.

Once a QR code has been generated, the method may include, at 306, displaying or inserting the QR code within the stream (e.g., in a main portion of a video stream between video segments) or overlayed on the stream (e.g., superimposed over the ongoing video stream, or inserted into an L-bar or similar overlay component of the stream). In some embodiments, the streaming system may usually or always have a QR code showing, potentially associated with different invitations to scan. If no scan of a QR code is detected for some period of time, the method may include slowly increasing the size of the QR code until the stream is paused and the QR code takes up most of the screen.

QR codes and associated invitations may be generated and integrated into the content stream either client side (e.g., at streaming device 106), server-side (e.g., at streaming service 102 or even content source 104), or a combination thereof. In an example of integration via the streaming device 106, the device may obtain metadata of where or when to render and display the QR code from the streaming service API, from the HLS (http live stream) data itself, or from another source or schedule. In an example of server-side integration, portions or all of the stream provided from the streaming service to the streaming device may be customized to a specific customer or streaming device, and an advertisement with a specific device ID can be rendered in real time and supplied to the streaming device to play. In some examples with server-side rendering the rules of when where to render a QR code may be arbitrary. In another example, the advertisement or invitation may be generated server-side, and only the device-specific QR code may be rendered and displayed by the streaming device.

Any user device that scans the QR code may be directed to a network address associated with the streaming service API, where the scanning device may provide the metadata from the QR code to the API. Accordingly, a determination may be made whether the API has received the QR metadata from a user device, at 308.

If the QR metadata was received, at 308, the method may include redirecting the user scanning device to a confirmation page, a user input page to participate in surveys, quizzes, polls, or other content, or some other target page, at 310. The target page of the redirection may be based on metadata from the QR code, such as a verification or invitation identifier associated with a prompt displayed inviting a user to scan the QR code. The API may also verify that the stream is active, at 312, for example based on the stream ID or streaming device ID metadata from the QR code. At 314, the method may include continue presenting the stream based on verifying that the stream is active. The control of whether to continue the stream may be implemented at a streaming service 102, streaming device or streaming content module 108, or at another element of the streaming service, based on the verification through the streaming service API. The method may include looking for potential background streams or periodically generating QR codes, at 302 or 304.

If no QR metadata was received from a user scanning device, at 308, the method may include incrementing an "inactive" counter associated with the particular stream or device ID, at 316. The inactive counter may indicate how many QR codes have been displayed at the streaming device without a user scan being received, or some other method of tracking the likelihood of background streaming occurring. For example, the streaming service may employ an artificial intelligence (AI) or machine learning system that uses various factors to gauge the likelihood of background streaming, and may adjust responses based on an increasing likelihood. For example, at different threshold probabilities the system may (in increasing order of severity): show more QR codes, show larger QR codes, stop playing ads (which may preserve ad integrity or reduce cost), or stop playing content. The streaming service may even generate notifications to contact a streaming device user or operator (e.g., through phone calls, text messages, emails, or other methods). The counter or likelihood may be maintained or monitored at the streaming device, the streaming service, or both.

A determination may be made whether the inactive counter is greater than a selected threshold value, at 318. The threshold value may be a count of missed QR scans that dictate when a stream should be paused or stopped. If the count is not higher than the threshold, the method may include continuing the stream, at 314, and continuing to identify potential background streams or generate QR codes, at 302 or 304. However, if the inactive count is greater than the threshold, the method may include pausing or stopping the stream, at 320. This may include temporarily stopping the stream where it was, causing the streaming device to turn off or enter into a sleep mode, or other operations to minimize power usage or costs. In some embodiments, the method may include generating a QR code to display via the streaming device, at 304, for restarting the stream. If a uses scans the QR code of a paused stream, the API may then register the stream as valid or active again, and the stream may then resume.

Figure 4:
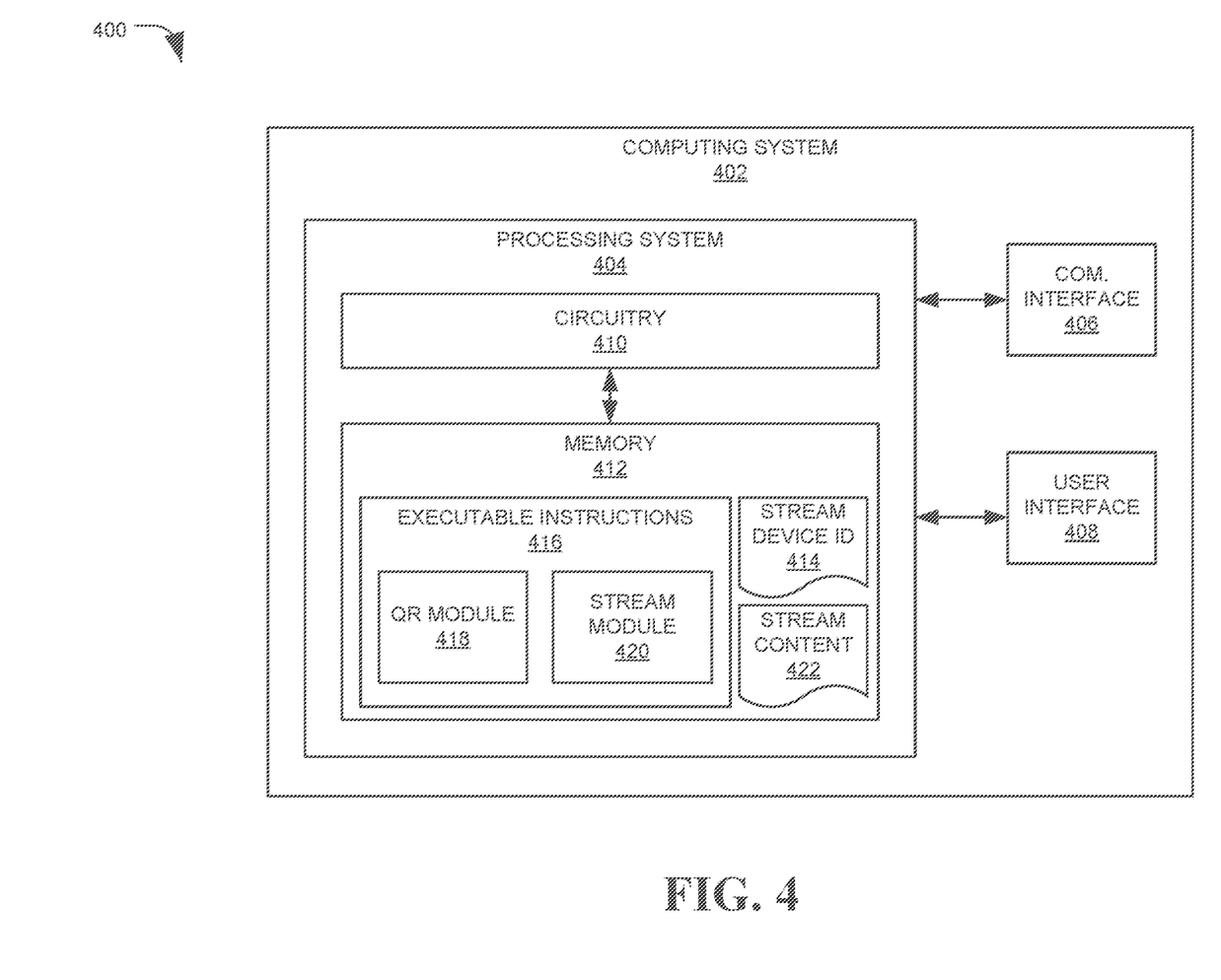
FIG. 4 is a diagram of a system configured to implement a QR scan for background streaming, in accordance with certain embodiments of the present disclosure.

FIG. 4 is a diagram of a system 400 configured to implement a QR scan for background streaming, in accordance with certain embodiments of the present disclosure. In particular, FIG. 4 depicts a computer system 402, which may be an example of any computing system that may be employed to perform the operations of streaming service 102, content source 104, streaming device 106 or streaming content module 108, user scanning device 116, and related processes and methods. Computing system 402 may include a processing system 404, a communication interface 406, and a user interface 408. Computing system 402 may include other components, such as a battery and enclosure, that are not shown for clarity. Computing system 402 may comprise one or more server computing systems, desktop computing systems, laptop computing systems, smartphone devices, set-top or streaming boxes, connected televisions, or any other computing system, including combinations thereof.

Communication interface 406 may comprise components that communicate over communication links, such as network cards, ports, radio frequency (RF), processing circuitry and software, or other communication components. Communication interface 406 may be configured to communicate over metallic, wireless, or optical links. Communication interface 406 may be configured to use Time Division Multiplex (TDM), Internet Protocol (IP), Ethernet, optical networking, wireless protocols, communication signaling, other communication formats, or any combinations thereof. In particular, communication interface 406 may be configured to communicate over a network 110 with streaming service 102, streaming device 106, content source 104, user scanning device 116, or other external systems. Communication interface 406 may also enable communication with local external devices, such as external storage or interface devices (e.g., database 112).

User interface 408 may comprise components that interact with a user to receive user inputs and to present media or other information. User interface 408 may include a display screen, touch screen, touch pad, keyboard, buttons, speaker, microphone, pointer device or interface, communication port, other user input/output apparatus, or any combination thereof. User interface 408 may also include camera or image capture apparatus for scanning elements such as QR codes. In some examples, user interface 408 may be a module configured to interface with a separate system for presenting information and receiving inputs. For example, computing system 402 may have limited or no direct user input components, but it connects (e.g., via communication interface 406) to a monitor or other device that may receive inputs via touch screen, remote control, or other input method, which inputs are then provided or relayed to computing system 402.

Processing system 404 may be linked to communication interface 406 and user interface 408. Processing system 404 can include processing circuitry 410 and memory device 412. Memory device 412 can store executable instructions or other operating software 416, as well as non-executable data files, such as stream device identifier (ID) data 414, and stream content 422. Stream device ID 414 may include a unique identifier for one or more streaming devices, which may be incorporated into generated QR codes for identifying devices that may be background streaming. For example, a streaming device may store its own device ID 414, and generate its own QR codes. In another example, a streaming service may maintain device IDs 414 for multiple client streaming devices, and may generate QR codes for those devices. Stream content 422 may include video, audio, advertising, or other content of a content stream, which may be provided from streaming service 102 or content source 104 to streaming device 106.

Processing circuitry 410 may comprise a microprocessor and other circuitry that can retrieve and execute instructions 416 from memory device 412. Memory 412 may comprise a non-volatile data storage medium, such as a disk drive or solid state drive, or volatile memory such as random access memories (RAM) and dynamic RAM (DRAM), or any other memory apparatus. In some examples, processing circuitry 410 may be mounted on a circuit board that may also hold memory device 412 and portions of communication interface 406 or user interface 408.

Executable instructions 416 may comprise computer programs, firmware, or some other form of machine-readable processing instructions. Executable instructions 416 may include QR module 418, and stream module 420, although related operations may be handled by multiple different modules or programs (potentially located on multiple computing devices), all operations may be performed by a single module, or additional modules may be included in executable instructions 416. For example, elements or aspects of QR module 418 and stream module 420 may be implemented by streaming service 102, streaming device 106 or streaming content module 108, content source 104, other systems, or a combination thereof. Executable instructions 416 may further include an operating system, utilities, drivers, network interfaces, applications, or other types of software. When executed by processing circuitry 410, executable instructions 416 may direct processing system 404 to operate computing system 402 as described herein.

QR module 418 may be a set of instructions for generating QR codes, inserting QR codes into a content stream, or both. In some examples, QR module 418 may also generate invitations or advertisements with which to display the QR code, such as invitations to participate in a survey or enter a contest. QR module 418 may also receive or send indication regarding whether a QR code has been scanned, to influence stream playback. For example, QR module 418 may interact with a streaming service API to determine whether a user device has scanned a QR code and used it to connect to the API. A QR module 418 located at a client system 106 may be configured to determine how or way to overlay or insert the QR code into the stream content 422, for example by interpreting instructions or metadata from a streaming service API or HLS data feed. At other systems, such as a streaming service 102 or content provider 104, a QR module 418 may generate or integrate the QR code into the stream content 422 prior to providing it to a streaming device 106.

Stream module 420 may include a set of computer functions or instructions for transmitting or receiving stream content 422. Stream module 420 may be responsible for encoding or decoding content from a first format (e.g., a video content format) into packets for transmission over a network 110 via communication interface 406. Stream module 420 may store stream content 422, extract and interpret metadata or instructions received with stream content 422, and provide metadata instructions or indication to QR module 418.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
controlling play of a content stream based on verifying whether the content stream is currently being viewed, including:
identifying the content stream as potentially not currently being viewed;
generating a scannable indicator including metadata related to the content stream based on the identification;
displaying the scannable indicator during the content stream;
receiving a message indicating that the scannable indicator has been scanned by a user device; and
continuing to display the content stream based on the message.

2. The method of claim 1 further comprising:
the metadata includes a device identifier for a streaming device displaying the content stream.

3. The method of claim 2 further comprising:
directing a scanning device to provide notice that the scannable indicator has been scanned, including:
connecting over a network to an application program interface (API) of a stream provider service; and
providing the device identifier to the API to indicate that the scannable indicator has been scanned by the scanning device.

4. The method of claim 3 further comprising:
displaying an invitation to scan the scannable indicator along with the scannable indicator;
including a verification identifier associated with the invitation in the metadata; and
directing the scanning device, via the scannable indicator, to provide the verification identifier to the API to be rerouted to web content associated with the invitation.

5. The method of claim 4 further comprising the invitation includes a request for a user response via the web content.

6. The method of claim 1 further comprising displaying the scannable indicator as a quick response (QR) code dynamically generated based on the metadata.

7. The method of claim 1 further comprising disabling the content stream based on not receiving the message indicating that the scannable indicator has been scanned.

8. A system comprising:
one or more processing circuits configured to implement a content streaming system to control play of a content stream based on verifying whether the content stream is currently being viewed, including:
identify the content stream as potentially not currently being viewed;
generate a scannable indicator including metadata related to the content stream based on the identification;
display the scannable indicator during the content stream;
receive a message indicating that the scannable indicator has been scanned by a user device; and
continue to display the content stream based on the message.

9. The system of claim 8 further comprising:
the one or more processing circuits include a streaming device configured to display the content stream on a display device; and
the metadata includes a device identifier for the streaming device.

10. The system of claim 9 further comprising:
the one or more processing circuits include a stream provider server configured to provide the content stream to the streaming device;
the content streaming system further configured to generate the scannable indicator to cause a scanning device to provide notice that the scannable indicator has been scanned, including:
connect over a network to an application program interface (API) of the stream provider server; and
provide the device identifier to the API to indicate that the scannable indicator has been scanned by the scanning device.

11. The system of claim 10 further comprising:
the stream provider server further configured to provide the message to the streaming device indicating that the scannable indicator has been scanned and directing the streaming device to continue to display the content stream.

12. The system of claim 10 further comprising:
the streaming device further configured to:
   display an invitation to scan the scannable indicator along with the scannable indicator;
   the metadata includes a verification identifier associated with the invitation; and
   the scannable indicator is configured to direct the scanning device to provide the verification identifier to the API to reroute the scanning device to web content associated with the invitation.

13. The system of claim 12 further comprising the invitation includes a request for a user response via the web content.

14. The system of claim 8 comprising the content streaming system further configured to display the scannable indicator as a quick response (QR) code dynamically generated based on the metadata.

15. The system of claim 8 comprising the content streaming system further configured to disable the content stream based on not receiving the message indicating that the scannable indicator has been scanned.

16. A memory device storing instructions that, when executed, cause a processor to perform a method comprising:
controlling play of a content stream based on verifying whether the content stream is currently being viewed, including:
   identifying the content stream as potentially not currently being viewed;
   generating a scannable indicator including metadata related to the content stream based on the identification;
   displaying the scannable indicator during the content stream;
   receiving a message indicating that the scannable indicator has been scanned by a user device; and
   continuing to display the content stream based on the message.

17. The memory device of claim 16 storing instructions that, when executed, cause the processor to perform the method further comprising:
   the metadata includes a device identifier for a streaming device displaying the content stream;
   directing a scanning device to provide notice that the scannable indicator has been scanned, including:
      connecting over a network to an application program interface (API) of a stream provider service; and
      providing the device identifier to the API to indicate that the scannable indicator has been scanned by the scanning device.

18. The memory device of claim 16 storing instructions that, when executed, cause the processor to perform the method further comprising:
   displaying an invitation to scan the scannable indicator along with the scannable indicator;
   including a verification identifier associated with the invitation in the metadata; and
   directing a scanning device, via the scannable indicator, to provide the verification identifier an application program interface (API) of a stream provider service to be rerouted to web content associated with the invitation.

19. The memory device of claim 16 storing instructions that, when executed, cause the processor to perform the method further comprising dynamically generating the scannable indicator as a quick response (QR) code based on the metadata.

20. The memory device of claim 16 storing instructions that, when executed, cause the processor to perform the method further comprising disabling the content stream based on not receiving the message indicating that the scannable indicator has been scanned.

* * * * *